Patented Dec. 12, 1939

2,182,920

UNITED STATES PATENT OFFICE 2,182,920

3-KETO-CYCLOPENTANOPOLYHYDRO-PHENANTHRENES

Max Hartmann, Riehen, near Basel, and Albert Wettstein, Basel, Switzerland, assignors to the firm of Society of Chemical Industry in Basle, Basel, Switzerland No Drawing. Application July 23, 1936, Serial No. 92,250. In Switzerland August 2, 1935

5 Claims. (Cl. 260—397)

This invention relates to the manufacture of new esters of saturated or unsaturated oxy-ketones of the type of androstanol-(17)-one-(3) which consists in treating such an oxy-ketone with a compound capable of reacting to form an acid derivative and containing together with the esterifying group a group capable of salt formation.

Suitable esterifying reagents are for example acid chlorides, acid anhydrides for instance succinic anhydride, maleic anhydride, phthalic anhydride, chloro-sulfonic acid, phosphorus oxy-chloride, and the like.

As oxy-ketones there come into question for instance androstanol-(17)-one-(3), 17-methyl-androstanol-(17)-one-(3), $\Delta^{4,5}$-androstenol-(17)-one-(3), $\Delta^{4,5}$-17-methyl-androstenol-(17)-one-(3) or their stereo-isomerides.

The new compounds are characterized by forming freely water-soluble salts; they are useful in therapeutics.

The following example illustrates the invention:

A mixture of 0.6 gram of $\Delta^{4,5}$-androstenol-(17)-one-(3), 0.6 gram of succinic anhydride and 2 cc. of absolute pyridine are heated together for several hours on the boiling water bath. After removing the excess of pyridine in a vacuum, the radical is extracted with sodium carbonate solution. The sodium carbonate solution is shaken with ether and the aqueous layer acidified, whereby the succinic acid ester of $\Delta^{4,5}$-androstenol-(17)-one-(3) is precipitated; this can be recrystallized from benzene. It has dimorphous forms which melt at 182–184° C. and 191–193° C. respectively.

Besides $\Delta^{4,5}$-androstenol-(17)-one-(3), other saturated and unsaturated 3-keto-17-oxy-androstane compounds for instance androstanol-(17)-one-(3) and $\Delta^{4,5}$-17-methyl-androstenol-(17)-one-(3), may be converted into their succinic acid esters in analogous manner. Quite similarly water-soluble esters of the said parent materials with, for example, maleic acid, phthalic acid, chloro-sulfonic acid or phosphorus oxy-chloride may be made. The esters thus obtained are all solid crystalline compounds.

Instead of pyridine, another condensing agent, for instance quinoline or a dialkylaniline, may be used. The esterification, however, may be conducted without a condensing agent.

What we claim is:

1. The 3-keto-cyclopentanopolyhydrophenanthrenes containing in 17-position the $$\text{group}-\underset{|}{\overset{R}{C}}-\text{O}-\text{Ac}$$

wherein R is a member of the group consisting of hydrogen and a lower alkyl radical, and Ac stands for an acid radical containing a member of the class consisting of the carboxyl, sulphonic acid and phosphoric acid groups.

2. The compounds of the formula

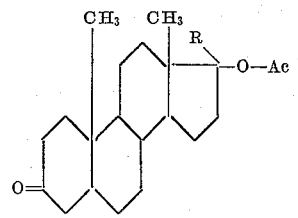

wherein R is a member of the group consisting of hydrogen and a lower alkyl radical, and Ac stands for an acid radical containing a member of the class consisting of the carboxyl, sulphonic acid and phosphoric acid groups.

3. The compounds of the formula

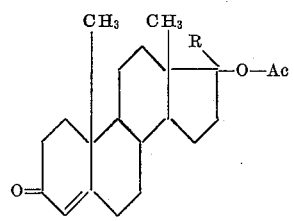

wherein R is a member of the group consisting of hydrogen and a lower alkyl radical, and Ac stands for an acid radical containing a member of the class consisting of the carboxyl, sulphonic acid and phosphoric acid groups.

4. The compound of the formula

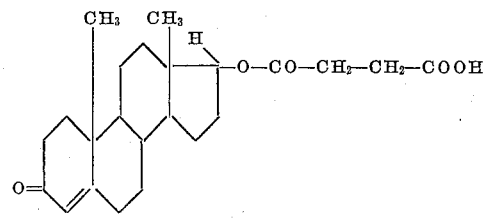

5. The compound of the formula

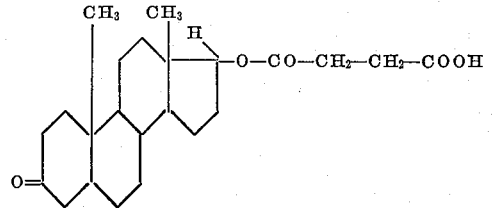

MAX HARTMANN.
ALBERT WETTSTEIN.

CERTIFICATE OF CORRECTION.

Patent No. 2,182,920. December 12, 1939.

MAX HARTMANN, ET AL.

It is hereby certified that error appears in the printed specification of the above numbered patent requiring correction as follows: First column, line 55, claim 1, in the formula, strike out the word "group" and insert the same at the end of line 54, after "the"; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.